Dec. 28, 1926.
C. W. SPICER
UNIVERSAL JOINT
Filed July 5, 1924
1,612,322
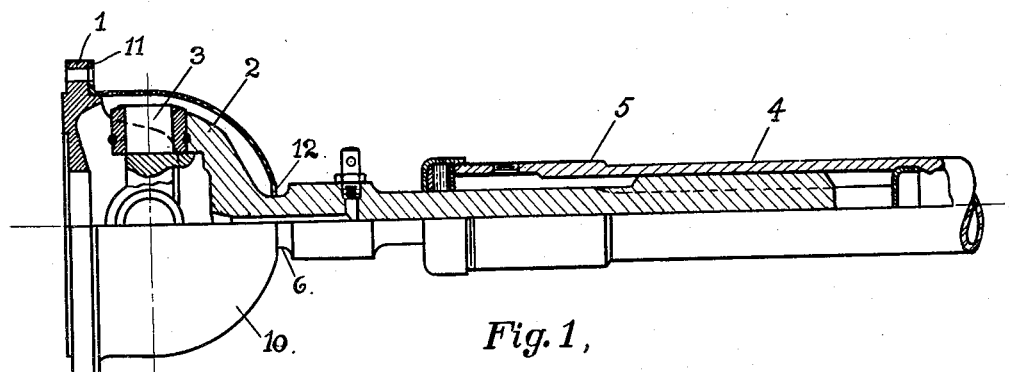
Fig. 1,
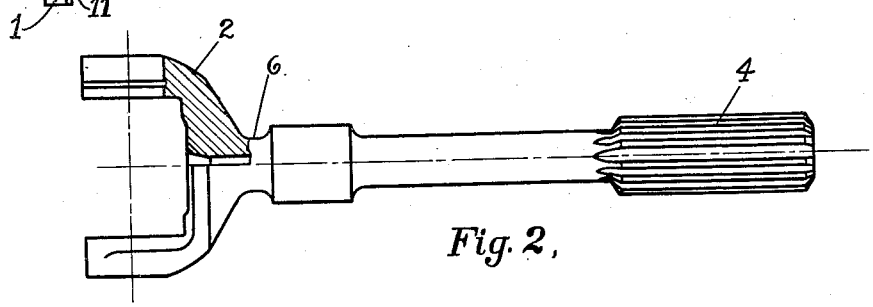
Fig. 2,
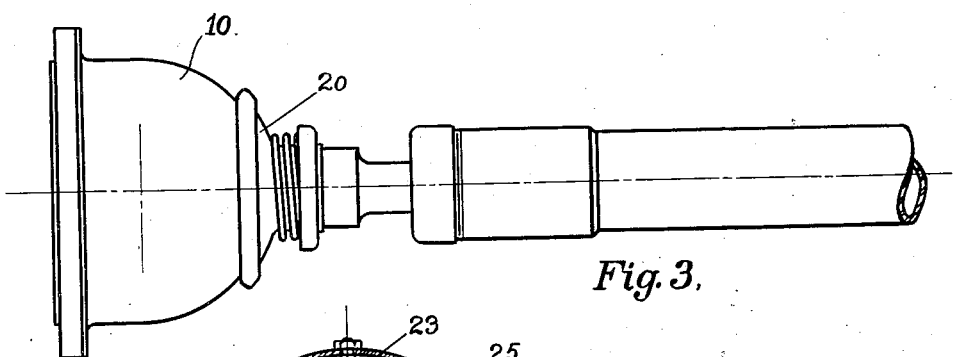
Fig. 3,
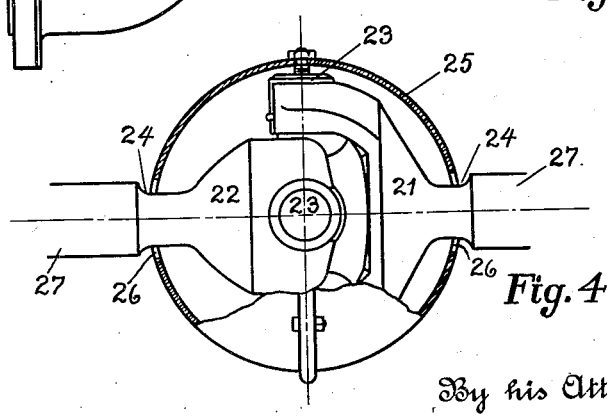
Fig. 4,
Inventor
CLARENCE WINFRED SPICER
By his Attorney Patented Dec. 28, 1926.

1,612,322

UNITED STATES PATENT OFFICE.

CLARENCE WINFRED SPICER, OF PLAINFIELD, NEW JERSEY, ASSIGNOR TO SPICER MANUFACTURING CORPORATION, A CORPORATION OF VIRGINIA.

UNIVERSAL JOINT.

Application filed July 5, 1924. Serial No. 724,419.

My invention relates to improvements in universal joints, more particularly to that class of joints which is employed for transmitting motion between shafts or other rotating objects the angle between which may be at all times variable and has for its object to produce a simple, compact and reliable joint that will make lubrication more effective by retaining the lubricant in the reservoir and thereby preventing the joint from running dry.

In the design of all incased universal joints the problem is to keep the lubricant within the lubricating chamber and thereby prevent the joint from running dry. With the type of joint wherein the driving and driven members are incased, the casing provided with openings through which the members extend and are free to move therethru, great ingenuity has been shown, as evidenced by the numerous patents which have been issued, in endeavor to close up these openings by forming a coacting flange on the member passing through the openings which is kept in tight contact with the casing either on the outside or on the inside thereof. After long and careful experimenting I have found that it was impossible to keep a casing joint of this character tight and that when the coacting flange is placed inside the casing the action of the two surfaces in contact with each other had a tendency to wipe all the lubricant out of the reservoir and thereby causing the universal joint to run dry long before it otherwise would.

I have overcome this fault common to all previously known incased universal joints by producing a casing, the opening of which does not require to be completely closed to retain the lubricant, by utilizing centrifugal force, capillary attraction and molecular adhesion to keep the lubricant within the reservoir. I have also discovered that if the moving parts within the casing have a minimum clearance between the outside diameter of the moving parts and the inside of the casing so that the lubricant can flow on either surface of the parts or the casing without contacting with the opposed surface, the lubricant would not be wiped out of the reservoir. This minimum clearance in practice I have found to be one sixteenth of an inch with the lubricants in common use. I do not wish, however, to confine myself to this specified minimum clearance, but to a clearance greater than the minimum required depending on the viscosity of the lubricant used. One of the features of my invention is to produce the parts so that this minimum clearance is never encroached upon and to leave the opening which heretofore has been thought desirable to close, completely open.

The foregoing and other features of my invention will now be described in connection with the accompanying drawing forming part of this specification in which I have represented my incased universal joint in its preferred form, after which I shall point out more particularly in the claims those features which I believe to be new and of my own invention.

In the drawings:—

Figure 1 is a side view of a universal joint embodying my invention in part section.

Figure 2 is a side view of one of the yokes I may employ.

Figure 3 is a view of a joint shown in Figure 1 with the dust cap in place.

Figure 4 is a modification which I may employ.

In the carrying out of my invention almost any type of universal joint may be illustrated, the invention being in providing a driving and driven member, either or both, with a portion of minimum diameter adjacent the joint and a casing so designed that it covers the joint and projects into or toward the reduced portion or portions.

In Figure 1, I illustrate a well known type of universal joint embodying my improvement in which I employ a flange yoke 1 and spline yoke 2 both operatively connected to a journal 3. The yoke 2 is provided with a spline 4 adapted to engage a hollow shaft 5 and be free to move axially therein and have driving connection therethru.

It is perfectly obvious that the spline yoke may be a non-slip yoke as that does not in any way affect my invention herein illustrated or described.

Between the yoke 2 and the spline 4 I provide a reduced portion 6 of minimum diameter, which is so shaped that the curvature of the yoke dies into the base of the reduced portion through an easy curve.

A casing 10 which serves as a lubricating chamber is provided with a flange 11 and an opening 12; the flange 11 is adapted to be carried on the flange yoke. The opening 12 is of sufficient size to permit its passage over the spline 4. It will be seen by referring to Figure 1 that the casing is so shaped that it extends over the universal joint and into the reduced portion. The minimum clearance between the yoke and the casing is one sixteenth of an inch which I have found to be the clearance necessary for the lubricants in common use in order to prevent the action of the joint from wiping the lubricant out of the casing. It must be understood that this minimum depends upon the viscosity of the lubricant used and is provided so that the lubricant can flow on either the surface of the casing or yoke without being retarded by contact with the surface of the other part.

Referring to Figure 4 in which another type of joint is illustrated but embodying the same invention, the driving and driven members 21 and 22 are in the form of yokes journaled together at 23. At that portion of the yoke adjacent the joint a reduced portion 24 is provided of minimum diameter which is so shaped that the curvature of the yoke dies into the base of the reduced portion through an easy curve. A casing 25 which may be supported from either yoke or from the journal 23 as illustrated extends over the joint and into the reduced portion. The openings 26 are just large enough to be assembled over the hubs 27. The casing may be made in two parts as may be desirable.

In my oil tight joint as applied to the different joints in no place does the yoke contact with the casing to make the joints now on the market, but the parts are so designed and co-act that natural forces are harnessed to retain the lubricant within the casing.

Long experimentation has demonstrated that many joints that may be made reasonably tight for continuous use, throw oil badly when used intermittently. Each stop allows the lubricant to run outside the casing and upon starting up the lubricant, being on some large diameter of the joint, is thrown off. In my joint when the joint starts to revolve, if any lubricant has run down on the reduced portion, the lubricant on the larger diameter of the yoke is thrown off by centrifugal force and then the oil on the reduced portion is drawn up onto the larger diameter by molecular attraction thus retaining the oil within the casing.

It will be observed that in all the modifications shown on the drawings the yoke is so shaped that the reduced portion is adjacent the joint the diameter of which increases rapidly after leaving the reduced portion. When the joint and shaft is at rest in the position shown in Figures 1 and 4 any lubricant which is on the upper part of the yoke may run down and onto the reduced portion. The diameter of the reduced portion is such that when the shaft starts to revolve the centrifugal force is not sufficient to throw the lubricant until after the lubricant starts back up the curved surface of the yoke due to greater centrifugal force at its larger diameter whereupon capillary attraction and molecular adhesion draws the lubricant out of the reduced portion thereby retaining it within the casing which is so designed to extend over that portion of the reduced portion onto which the lubricant may flow when the shaft is at rest.

It is a well known law of capillary phenomena that every liquid behaves as if in a thin film exerting a constant effort to contract, and that the liquid is attracted to a solid if the solid has been previously wet. From this it is readily apparent that any lubricant resting on the straight low spot of the restricted area near the edge of the casing will have a greater force to make it creep back to the yoke than travel in the opposite direction over a portion of the restricted area that is dry. Also it will be readily understood that the contractive force tends to draw the lubricant together until it creeps up on the larger diameter of the yoke when centrifugal force makes it fly off within the casing where it stays no matter what the speed of the joint.

Under the conditions of use such as found in automobiles, a dust shutter 20 may be provided to prevent dust and dirt from entering the casing but this dust cap in no way is used to keep the lubricant within the casing.

I wish it distinctly understood that my incased universal joint herein described and illustrated is in the form in which I desire to construct it but that changes or variations may be made as may be convenient or desirable without departing from the salient features of my invention and I therefore intend the following claims to cover such modifications as naturally fall within the lines of invention.

I claim:—

1. An encased universal joint comprising in combination a driving and driven member, one of said members being provided with a flange and the other member provided with a male spline and an enlarged portion adjacent a yoke, said enlarged portion provided with a groove the sides of which gradually curve into the yoke; a casing forming a reservoir for the lubricant adapted to be secured to the flanged member and extend over the yoke end of the spline member in spaced relation thereto and into the groove in the enlarged portion, said casing provided with an opening the diameter of which is approximately the same as the diameter of the enlarged portion, whereby the lubricant through natural forces creeps up the yoke without interference and is thereby retained within the casings.

2. The device of claim 1 with the addition that the space between the casing and the driving and driven members shall be a minimum of one sixteenth of an inch with all working angles.

In testimony whereof I affix my signature.

CLARENCE W. SPICER.